(12) United States Patent
Hunt

(10) Patent No.: US 6,967,765 B2
(45) Date of Patent: Nov. 22, 2005

(54) ACTIVE OPTICAL SYSTEM FOR CHANGING THE WAVELENGTH OF AN IMAGE

(75) Inventor: Jeffrey H. Hunt, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/984,719

(22) Filed: Nov. 8, 2004

(65) Prior Publication Data

US 2005/0094146 A1    May 5, 2005

Related U.S. Application Data

(63) Continuation of application No. 10/139,011, filed on May 3, 2002, now Pat. No. 6,819,476.

(51) Int. Cl.$^7$ ................................................ G02F 2/02
(52) U.S. Cl. ...................... 359/326; 359/237; 359/247
(58) Field of Search .................... 359/326–332, 359/237–240, 245–248, 263, 265–275

(56) References Cited

U.S. PATENT DOCUMENTS

| | | |
|---|---|---|
| 5,105,301 A | 4/1992 | Campi |
| 5,339,370 A | 8/1994 | Sano et al. |
| 5,521,743 A | 5/1996 | Holmes et al. |
| 6,046,841 A | 4/2000 | Mahgerefteh et al. |
| 6,115,170 A | 9/2000 | Puzey |
| 6,137,624 A | 10/2000 | Taira |
| 6,211,999 B1 | 4/2001 | Gopalan et al. |
| 6,215,580 B1 | 4/2001 | Kouta |
| 6,819,476 B2 * | 11/2004 | Hunt .......................... 359/326 |
| 2001/0017727 A1 | 8/2001 | Sucha et al. |

* cited by examiner

Primary Examiner—John D. Lee
(74) Attorney, Agent, or Firm—Marshall, Gerstein & Borun LLP

(57) ABSTRACT

A first control optics assembly receives an incoming optical image. A template optical element produces a template optical intensity profile. A second control optics assembly receives the template optical intensity profile. A polarization separator receives an output from the second control optics. A quarter wave plate changes the polarization of the polarized output therefrom. A combiner receives an output from the first control optics assembly and an output from the quarter wave plate and provides a combined, co-linear propagation output image having an initial beam size. An SLM provides absorption of a portion of the combined output image which changes the local index of refraction of the SLM so that the local reflection at the template optical intensity profile changes. The template optical intensity profile reproduces the image of the absorbed portion as an outgoing image that is reflected back through a portion of the system providing a converted image having substantially the same intensity pattern as the incoming optical image but a different wavelength.

9 Claims, 1 Drawing Sheet

ACTIVE OPTICAL SYSTEM FOR CHANGING THE WAVELENGTH OF AN IMAGE

CROSS-REFERENCE TO RELATED APPLICATION

This is a Continuation of U.S. application Ser. No. 10/139,011, filed on May 3, 2002, which will issue as U.S. Pat. No. 6,819,476 on Nov. 16, 2004.

BACKGROUND OF THE INVENTION

1. Field of the Invention

This invention relates to active optical systems and more particularly to an active optical system for changing the wavelength of an incoming optical image.

2. Description of the Related Art

Frequently, in opto-electronic applications, devices exist that require inputs within a certain wavelength band. Unfortunately, due to optical hardware constraints such as laser output wavelength, optimum optical fiber transmission wavelength, etc., there are frequently mismatches between an image's actual wavelength and the wavelength required for operation in a certain optical device. Typically, converting an image (or two-dimensional signal array) from one wavelength to another requires changing the optical signal to an equivalent electronic signal and reconverting the electronic signal to a wavelength within the desired band. This causes signal processing bottlenecks, reduced speed, reduced bandwidth as well as increased size, weight, volume and complexity of the associated optical hardware.

U.S. Pat. No. 6,046,841, issued to Mahgerefth et al., discloses and all-optical wavelength conversion system having an optical discriminator. The optical signal produced by a semiconductor-optical-amplifier based wavelength converter is passed through an optical discriminator. The resulting signal has improved extinction ratio for return-to-zero data and improved high-frequency response for both non-return-to-zero and return-to-zero data.

U.S. Pat. No. 6,137,624, issued to Taira, discloses a wavelength converting device comprising a plurality of nonlinear optical crystals for transmitting light by second harmonic generation. Each crystal piece has a crystal axis respectively and is positioned with the crystal angle satisfying a phase matching condition for second harmonic generation and so that the adjacent crystal axis is oriented in a crystallographically different way. In one embodiment, the acceptance angle, $\phi$, in the insensitive direction becomes the same as the acceptance angle, $\theta$, in the sensitive direction. Therefore, there is no need for gathering light to an oval shape, and maximum conversion efficiency can be obtained by gathering light with a conventional spherical lens.

U.S. Pat. No. 6,211,999, issued to Gopalan et al., discloses a lithium tantalate single-crystal and photo-functional device. Provided are a lithium tantalate single-crystal that requires a low voltage of not larger than 10 kV/mm for its ferroelectric polarization inversion and of which the. polarization can be periodically inverted with accuracy even at such a low voltage, and a photo-functional device comprising the crystal. The crystal has a molar fraction of $Li_2O/(Ta_2O_5 + Li_2O)$ of falling between 0.492 and 0.50. The functional device can convert a laser ray being incident thereon or can be used as a physical memory.

U.S. Pat. No. 6,215,580, issued to Kouta, discloses a wavelength converter for generating optical harmonics of incident laser light at high efficiency and a method for varying wavelength of incident laser light. Nonlinear optical crystal $\beta$-$BaB_2O_4$.4 is available for generating optical harmonics of incident laser light, and an absorption spectrum shifter, a heat sink and a walk-off angle compensator are selectively provided for the non-linear optical crystal for increasing the efficiency of generating the optical harmonics.

SUMMARY

The present invention is an active optical system for changing the wavelength of an incoming optical image. It includes a first control optics assembly for receiving an incoming optical image and adjusting that incoming optical image in accordance with first desired wavelength and beam propagation parameters. A template optical element produces a template optical intensity profile. A second control optics assembly receives the template optical intensity profile and adjusts that template optical intensity profile in accordance with second desired wavelength and beam propagation parameters. A polarization separator receives an output from the second control optics and polarizes the second control optics output. A quarter wave plate receives the polarized output from the polarization separator and changes its linear polarization into a circular polarization. A combiner receives an output from the first control optics assembly and an output from the quarter wave plate. The combiner provides a combined, co-linear propagation output image having an initial beam size. A spatial light modulator (SLM) addressing optics receives the combined, co-linear propagation output image and produces a desired beam size for the combined, co-linear propagation output image. An SLM receives the output from the SLM addressing optics and provides absorption of a portion of the combined, co-linear propagation output image. The absorbed portion is the incoming optical image. This absorption changes the local index of refraction of the SLM so that the local reflection at the template optical intensity profile changes. The template optical intensity profile reproduces the image of the absorbed portion as an outgoing image. The outgoing image is reflected back through the quarter wave plate via the combiner and rotated 90° relative to the template optical intensity profile by the quarter wave plate. It is separated by the polarization separator, thus providing a converted image having substantially the same intensity pattern as the incoming optical image but a different wavelength.

The present system produces copies of the input signal image intensity at a different wavelength. The device works in a manner that allows direct optical to optical translation, without having to change the signal into an electronic incarnation. This invention allows converting the wavelength to one within the desired band while the signal remains in an optical state. With a direct optical to optical translation, bottlenecks do not form and the bandwidth of the overall system is not affected by the wavelength changing hardware.

DETAILED DESCRIPTION OF THE INVENTION

Figure 1:
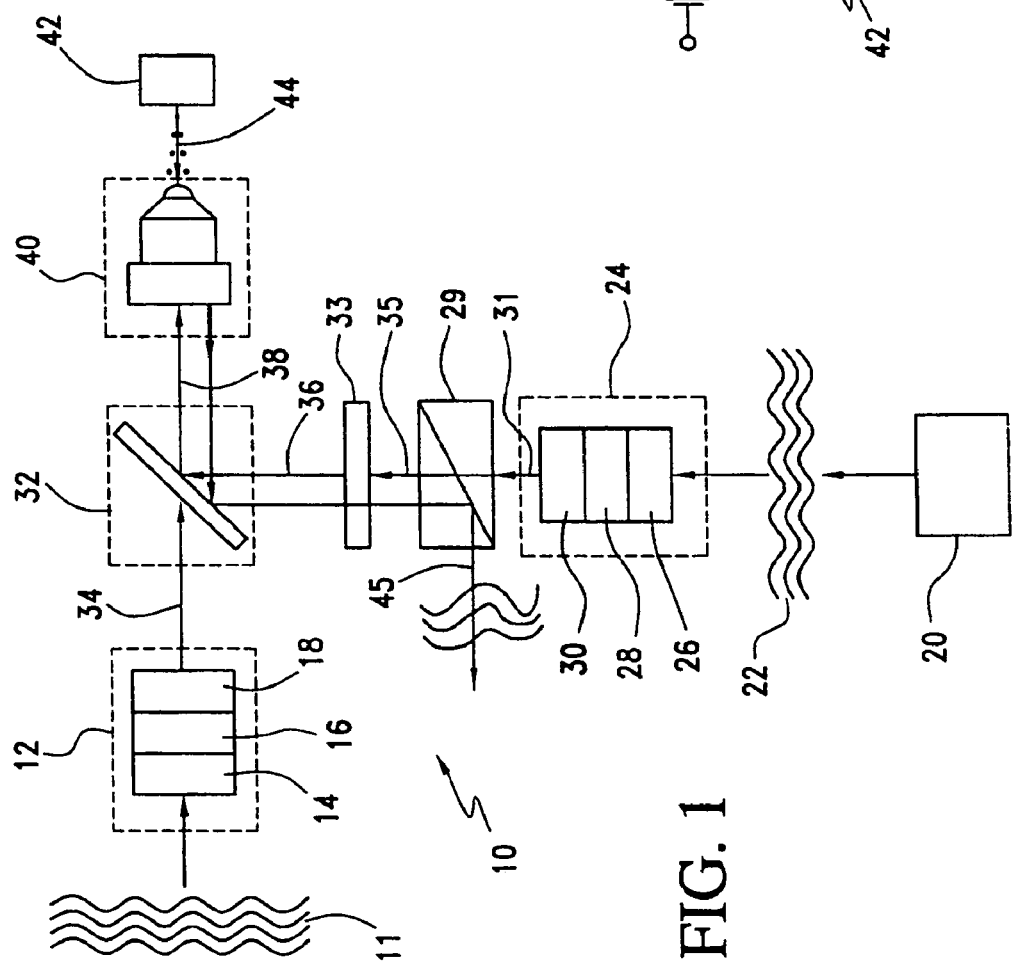
FIG. 1 is a schematic view of a preferred embodiment of the active optical system of the present invention.

Referring to the drawings and the characters of reference marked thereon FIG. 1 illustrates a preferred embodiment of the present invention, designated generally as 10. An incoming optical image 11 is received by a first control optics assembly, designated generally as 12 The image of an optical beam is generally described as the contour of constant phase over the physical cross-section of the beam. Although any optical source will have a phase associated with it, in most cases, sources will be objects that are being imaged or will be from transmitters of digitally encoded optical beams. The first control optics assembly 12 adjusts the incoming optical image 11 in accordance with desired wavelength and beam propagation parameters. These parameters could include, for example, precise wavelength filtering to the expected signal wavelength, the optical bandwidth of the incoming signal, or the polarization of the light. The wavelength may be controlled to fit within the detection range of the photodiode. It may be more precisely filtered to fit a known input signal, either from an image or from a digitally encoded communication beam. The present invention operates with wavelengths longer than 1 micron. The preferred minimum wavelength is about 1.1 micron. Optical signals from other sources at shorter wavelengths will effect the operation of the device and should therefore be eliminated. The assembly 12 preferably includes wavelength control element 14 such as a color filter, an etalon, a Fabry-Perot interferometer, a Fizeau interferometer, a diffraction grating, or a notch filter, etc. A polarization control element 16 polarizes the image. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the detector must operate, etc. The image is then received by a propagation control element 18 such as a single lens, double lens, refractive elements, reflective elements or other system up to a fully engineered telescope.

A template optical element 20 for encoding produces a template optical intensity profile 22. The template optical element 20 may comprise, for example, a laser, a light emitting diode (LED), or broadband optical light source.

A second control optics assembly 24 adjusts the template optical intensity profile 22 in accordance with desired wavelength and beam propagation parameters. The assembly 24 preferably includes wavelength control element 26 such as a color filter, an etalon, a Fabry-Perot interferometer, a Fizeau interferometer, a diffraction grating, or a notch filter. A polarization control element 28 and a propagation control element 30 are utilized, as described above.

A polarization separator 29 receives an output 31 from the second control optics 24 and polarizes the second control optics output 31. The polarization separator 29 may be, for example, a polarizing beamsplitter, a brewster angle polarizer, a thin-film polarizer, a transmission polarizer, or any other suitable optical element which has a different effect on two linear orthogonal polarizations.

A quarter wave plate 33 receives the polarized output 35 from the polarization separator 29 and changes its linear polarization into circular polarization.

A combiner 32 receives the output 34 from the first control optics assembly 12 and the output 36 from the quarter wave plate 33. The combiner 32 provides a combined, co-linear propagation output image 38 having an initial beam size. In order for the phase-shifting to occur, the affected and template optical images must be physically registered in propagation space. The registration in propagation direction is achieved with appropriate timing, that is, the pulses enter the wavelength changer overlapped in time. The registration in the other two dimensions is accomplished by overlapping the physical cross-sections of the images. The combiner 32 allows for this overlapping in cross-section to take place. The combiner 32 may include, for example, a beamsplitter, a dichroic optic, or a diffraction grating.

To provide the correct beam size for matching the SLM, an SLM addressing optics 40 are provided. The SLM addressing optics 40 may include, for example, a plurality of lenses or curved reflectors. Typically, the SLM 42 will be on the order of 1 millimeter in diameter, although this may vary somewhat depending on the application. The active area of the SLM is the only place where the desired phase-shifting physical effect can take place. Consequently, this step is essential to assure that both affected and template beams enter that area of-the detector.

The SLM 42 receives the output from the SLM addressing optics 40 and provides absorption of a portion of the combined, co-linear propagation output image, that absorbed portion being the incoming optical image. This absorption changes the local index of refraction of the SLM 42 so that the local reflection at the template optical intensity profile changes. The template optical intensity profile reproduces the image of the absorbed portion as an outgoing image 44. The outgoing image is reflected back through the quarter wave plate 33 via the combiner 32 and rotated 90° relative to the template optical uniform intensity by the quarter wave plate 33 so as to be separated by the polarization separator 29. Thus, a converted image 45 is provided having substantially the same intensity pattern as the incoming optical image but a different wavelength.

Further optical processes may require a beam diameter that differs from that required for the SLM. These optics allow for the modification of the beam diameter or spot size.

Figure 2:
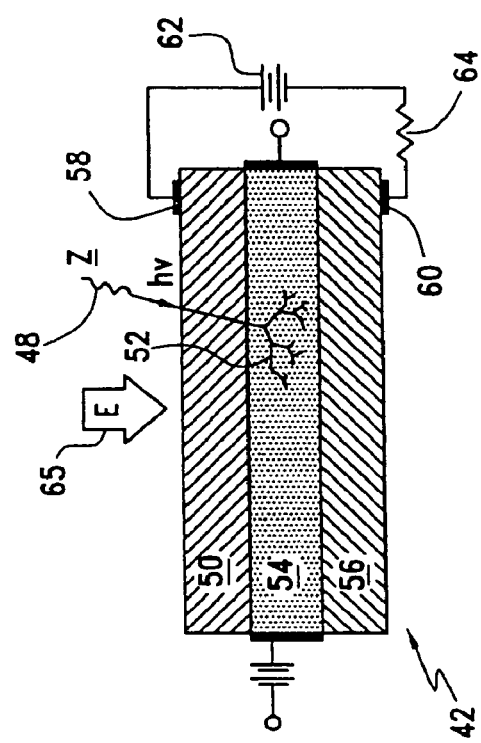
FIG. 2 (Prior Art) is a cross-sectional view of a spatial light modulator utilized by the present invention.

Referring now to FIG. 2 a preferred embodiment of the SLM 42 is illustrated. This is fully described and claimed in U.S. Pat. No. 5,521,743, issued to Holmes et al, incorporated herein by reference. This Figure shows a cross section of a three-layer photon counting photorefractive spatial light modulator with avalanche photodiode structure. A photon 48 is shown striking a positive doped semiconductor layer 50, causing an avalanche 52 of electrons to be released, the second layer is either a negative layer or an insulator 54, and the third layer is a negative layer 56. A charge is placed across the device by electrodes 58 and 60 connected to voltage source 62 and circuit resistance 64. In this manner electric field 65 is created across the device and if the photodetector is properly designed, it can be operated in the Geiger mode.

The overall performance of the device is enhanced by hot-carrier assisted absorption, the Franz Keldysh effect and by Gunn domain formation. These effects enhance the photoionization and avalanche gain. A spiked or alternating voltage waveform can also increase the sensitivity of the device. The device can be stacked in parallel or in series for improved primary electron quantum efficiency or multi-wavelength operation.

Avalanche photoelectron gain and ohmic heating are combined to drive the thermo-optic effect, as may be observed in existing silicon avalanche photodiodes. Using the avalanche process, and operating in the Geiger mode, one photon can cause the excitation of hundreds of millions of carrier electrons in a semiconductor. By utilizing the electrical energy supplied by external fields, the optical energy of a single absorbed quantum is multiplied sufficiently to induce a change of the optical properties of the spatial light modulator material. The localized current causes localized ohmic heating; the heating modifies the local carrier density and electronic structure. This results in a refractive index change that is proportional to the average supplied electrical current. Since the refractive index change is so localized no pixellation is required allowing for simplicity of fabrication and low cost manufacturing. The localized change in the index of refraction causes a localized change in the optical path length at-that position in the image. Consequently, only those localized positions, as addressed by the incoming optical image, will experience the change in optical path length. Light whose wavelength is longer than that associated with the silicon bandgap (longer than 1.1 micron) will be reflected from the active area since the surfaces of the avalanche photodiode create a cavity which is an asymmetric Fabry-Perot etalon. Since the level of reflection depends on the interior optical path length, the above described change in optical path length will cause a corresponding local change in the reflection. Consequently, the template optical intensity profile will be modulated by this local reflection change, causing it to reproduce the input image that initiated the physical process in the avalanche photodiode.

This present invention can be used in a number of optical applications. For example, it can be used, in conjunction with an optical coupler, as an optical refresher for a three-dimensional optical memory device. In this device, and others based on similar mechanisms, information is stored in a three dimensional array, where the active storage medium is a molecule which can be put into a long lived electronic excitation. The mechanism for introducing this excitation is a two-photon absorption, where the combined energy of the photons is usually equivalent to one ultraviolet photon. The stored information is read out by photon emission or flourescence at a visible wavelength. Although long lived, the molecular memory must be periodically refreshed because the lifetime of the excitation is not infinite. In order to do this, the information must be read out, changed to the longer writing wavelength and re-read into the molecule. At present, the only option is to change the information into an electronic equivalent in some sort of position sensitive detector, send the electronic information into a position sensitive source and generate the write beam at the other wavelength. The present invention allows for direct conversion without the intermediary electronic step. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An active optical system for converting an incoming optical image at a first wavelength to an output image at a second wavelength different than the first wavelength, the active optical system comprising:
   a first optical element assembly for producing the incoming optical image at the first wavelength;
   a template optical element for producing a template optical intensity profile;
   a combining optical element disposed to receive and combine the incoming optical image and the template optical intensity profile into a co-linear propagation output image; and
   a spatial light modulator for receiving the co-linear propagation output image and in response to absorbing the incoming optical image of the co-linear propagation output image, changing a local index of refraction of the spatial light modulator to change a local reflection for the template optical intensity profile, wherein at least a portion of the template optical intensity profile is reflected by the spatial light modulator to produce the output image at the second wavelength.

2. The active optical system of claim 1, further comprising:
   a second control optics assembly for providing the template optical intensity profile at the second wavelength;
   a polarization separator for receiving an output from the second control optics; and
   a quarter wave plate for changing an output from the polarization separator into a circular polarization output.

3. The active optical system of claim 1, wherein the combining optical element comprises a beamsplitter, dichroic optic, or diffraction grating.

4. A method of converting an incoming optical image at a first wavelength to an output image at a second wavelength different than the first wavelength, the method comprising:
   receiving the incoming optical image at a spatial light modulator;
   absorbing the incoming optical image by the spatial light modulator;
   in response to absorbing the incoming optical image, changing a local index of refraction of the spatial light modulator, such that an incident template optical intensity profile at a second wavelength is reflected by the spatial light modulator as the output image at the second wavelength different than the first wavelength and having an intensity profile substantially the same as the intensity profile of the incoming optical image.

5. The method of claim 4, further comprising:
   adjusting the incoming optical image in accordance with the first wavelength;
   adjusting said template optical intensity profile in accordance with the second wavelength; and
   combining the adjusted incoming optical image and the adjusted template optical intensity profile to provide a co-linear propagation output image to the spatial light modulator.

6. A method of converting an incoming optical image at a first wavelength to an output image at a second wavelength different than the first wavelength, the method comprising:
   combing a template optical intensity profile with the incoming optical image to produce a co-linear propagation output image;
   receiving the co-linear propagation output image at a spatial light modulator;
   absorbing the incoming optical image of the co-linear propagation output image in the spatial light modulator;
   in response to the absorbing, changing a local index of refraction of the spatial light modulator to change a local reflection for the template optical intensity profile; and
   in response to changing the local index of refraction, reflecting at least a portion of the template optical intensity profile by the spatial light modulator to produce the output image at the second wavelength.

7. The method of claim 6, further comprising adjusting the template optical intensity profile to the second wavelength.

8. The method of claim 7, further comprising:
   polarizing the template optical intensity profile to a first linear polarization template optical intensity profile;
   converting the linear polarization to a circular polarization template optical intensity profile; and
   combining the circular polarization template optical intensity profile with the incoming optical image to produce the co-linear propagation output image.

9. The method of claim 7, further comprising adjusting the incoming optical image to the first wavelength.

* * * * *